(12) United States Patent
States et al.

(10) Patent No.: US 6,705,644 B2
(45) Date of Patent: Mar. 16, 2004

(54) LATCHING MECHANISM FOR MACHINE STABILIZER ARMS

(75) Inventors: Douglas Scott States, Dubuque, IA (US); Peter John Mayer, Cuba City, WI (US); Wylie Elton Pfaff, Dubuque, IA (US); Thomas Andrew Knopp, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/202,289

(22) Filed: Jul. 24, 2002

(65) Prior Publication Data

US 2004/0017071 A1 Jan. 29, 2004

(51) Int. Cl.$^7$ .................................................. B60S 9/10
(52) U.S. Cl. ..................... 280/764.1; 403/315; 403/319
(58) Field of Search ........................... 280/763.1, 764.1, 280/766.1, 765.1, 6.153, 6.154, 6.155, 6.156; 403/319, 315, 117

(56) References Cited

U.S. PATENT DOCUMENTS

| | | | |
|---|---|---|---|
| 1,193,052 A | 8/1916 | Pirsch | |
| 3,951,281 A * | 4/1976 | Parquet | 414/697 |
| 3,955,695 A * | 5/1976 | Maurer | 414/697 |
| 4,026,428 A * | 5/1977 | Shumaker | 414/694 |
| 4,116,467 A * | 9/1978 | Ewert | 280/764.1 |
| 4,132,324 A * | 1/1979 | Long | 280/764.1 |
| 4,236,643 A * | 12/1980 | Schmitz | 414/694 |
| 4,278,394 A * | 7/1981 | Johnson | 414/694 |
| 4,286,803 A * | 9/1981 | Schulz | 280/764.1 |
| 4,295,661 A * | 10/1981 | Maurer | 280/765.1 |
| 4,515,520 A * | 5/1985 | Parquet et al. | 414/718 |
| 4,531,883 A * | 7/1985 | Arnold | 414/722 |
| 4,833,755 A | 5/1989 | Bonin | 16/344 |
| 4,951,984 A | 8/1990 | Huang | 292/76 |
| 5,051,057 A * | 9/1991 | Kremer | 414/685 |
| 5,064,339 A | 11/1991 | Ahlers | 414/687 |
| 5,074,010 A | 12/1991 | Gignac et al. | 16/334 |
| 5,243,771 A | 9/1993 | Kretchman et al. | 34/108 |
| 5,265,995 A * | 11/1993 | Beck | 414/694 |
| 5,488,788 A * | 2/1996 | Durbin | 37/443 |
| 5,547,220 A * | 8/1996 | Lagsdin | 280/763.1 |
| 6,076,855 A * | 6/2000 | Webb | 280/765.1 |
| 6,257,619 B1 * | 7/2001 | Bender et al. | 280/764.1 |
| 6,443,490 B2 * | 9/2002 | Webb | 280/765.1 |

FOREIGN PATENT DOCUMENTS

| | | |
|---|---|---|
| CH | 129231 | 12/1928 |
| DE | 26 19 701 | 11/1977 |
| GB | 990182 | 4/1965 |
| GB | 1 515 875 | 6/1978 |

OTHER PUBLICATIONS

Website Item "D. Lawless Hardware" at http://www.dlawlesshardware.com/catches.html.

* cited by examiner

Primary Examiner—Brian L. Johnson
Assistant Examiner—Jeffrey J. Restifo

(57) ABSTRACT

A latch mechanism for securing a backhoe loader stabilizer arm in a stowage position. The latch mechanism has a first portion attached to the machine frame and a second portion attached to the stabilizer arm. The first portion is a receptacle having two parallel members of a resilient material. The second portion is a probe having a head and a shank. The latch mechanism automatically engages and disengages as the arm approaches or departs the stowage position by the force applied in moving the stabilizer arm. The latch secures the stabilizer arm in the stowage position from external forces insufficient to disengage the latch.

17 Claims, 4 Drawing Sheets

LATCHING MECHANISM FOR MACHINE STABILIZER ARMS

FIELD OF THE INVENTION

The present invention is directed to a latch mechanism for latching the stabilizer arm of a backhoe loader to the machine frame during transport operations.

BACKGROUND OF THE INVENTION

A variety of work machines can be equipped with stabilizer arms for lateral stabilization of the machine during a work operation. A backhoe typically has two stabilizer arms that attach to the machine frame. The stabilizer arms of the backhoe attach to the frame by horizontal pivots and pivot relative to the frame about a horizontal axis. Linear actuators control the positions of the stabilizer arms.

During operations when the stabilizer arms are not in use, such as when the backhoe travels from one job site to another, the stabilizer arms are moved to a stowage position by the linear actuator. Each stabilizer arm on a backhoe is typically held in the stowage position solely by the linear actuator. However, as gravity acts against the linear actuator, the stabilizer arm may gradually lower. This lowering of the arm while in the stowage position is undesirable.

A number of latch mechanisms have been used on backhoes to prevent stabilizer arms from lowering while in the stowage position. Various examples of such latch mechanisms are disclosed in U.S. Pat. Nos. 3,951,281, 3,955,695 and 4,295,661. In all of the foregoing patents, like the present invention, the latch mechanism engages and disengages automatically as the stabilizer arm moves to and from the stowage position. In all of the foregoing patents, unlike the present invention, a portion of the latch mechanism attaches to the linear actuator.

SUMMARY OF THE INVENTION

It is the object of the present invention to provide for an improved latch mechanism for automatically securing a machine stabilizer arm where the latch mechanism is located between the stabilizer arm and the machine frame.

The present invention is a latch mechanism used on a work machine for latching a stabilizer arm to a machine frame. The latch mechanism has two portions, a latch receptacle and a latch probe. The latch receptacle attaches to the frame and the latch probe attaches to the stabilizer arm. The receptacle comprises two parallel rollers of a resilient material, rotationally mounted about a roller axle. A receptacle opening width separates both of the two rollers from one another. The probe has a head and a shank, the head being larger than the receptacle opening width, and the shank being smaller than the head. The latch receptacle and probe cooperate with each other such that the two parallel rollers restrain the probe when the arm is in the stowage position. Additionally, the two parallel rollers deform as the probe passes through the receptacle opening when the arm is moved to and from the stowage position by the force of a linear actuator, providing for automatic engagement and disengagement of the latch.

BRIEF DESCRIPTION OF THE DRAWINGS

FIG. 2a is a detail view of latch mechanism.

DESCRIPTION OF THE PREFERRED EMBODIMENT

Figure 1:
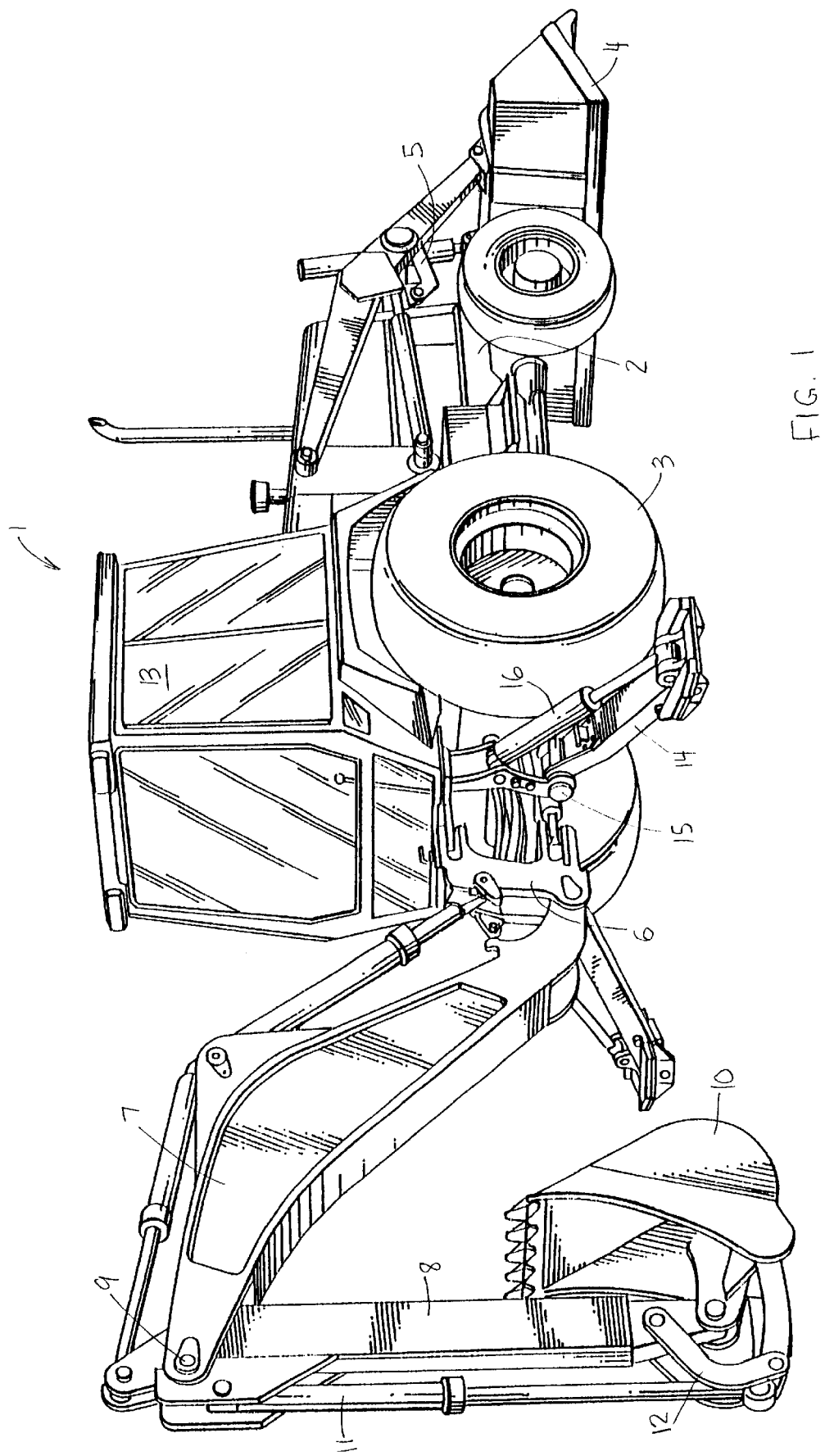
FIG. 1 is a rear perspective view of a backhoe loader.

FIG. 1 illustrates a work machine, such as a backhoe loader 1, having a frame 2 to which are mounted ground engaging wheels 3 for supporting and propelling the frame 2. A backhoe loader 1 has a loader bucket 4 having a suitable loader bucket linkage 5 for manipulating the loader bucket 4 relative to the frame 2. Attached to the rear of the machine frame 2 is a swing frame 6. A boom 7 pivotally couples to the swing frame 6, a dipperstick 8 pivotally connects to the boom 7 at pivot 9 and a backhoe bucket 10 pivotally connects to the dipperstick 8. A hydraulic cylinder 11 manipulates the backhoe bucket 10 through a bucket linkage 12. An operator controls the machine from an operator's station 13.

Figure 5:
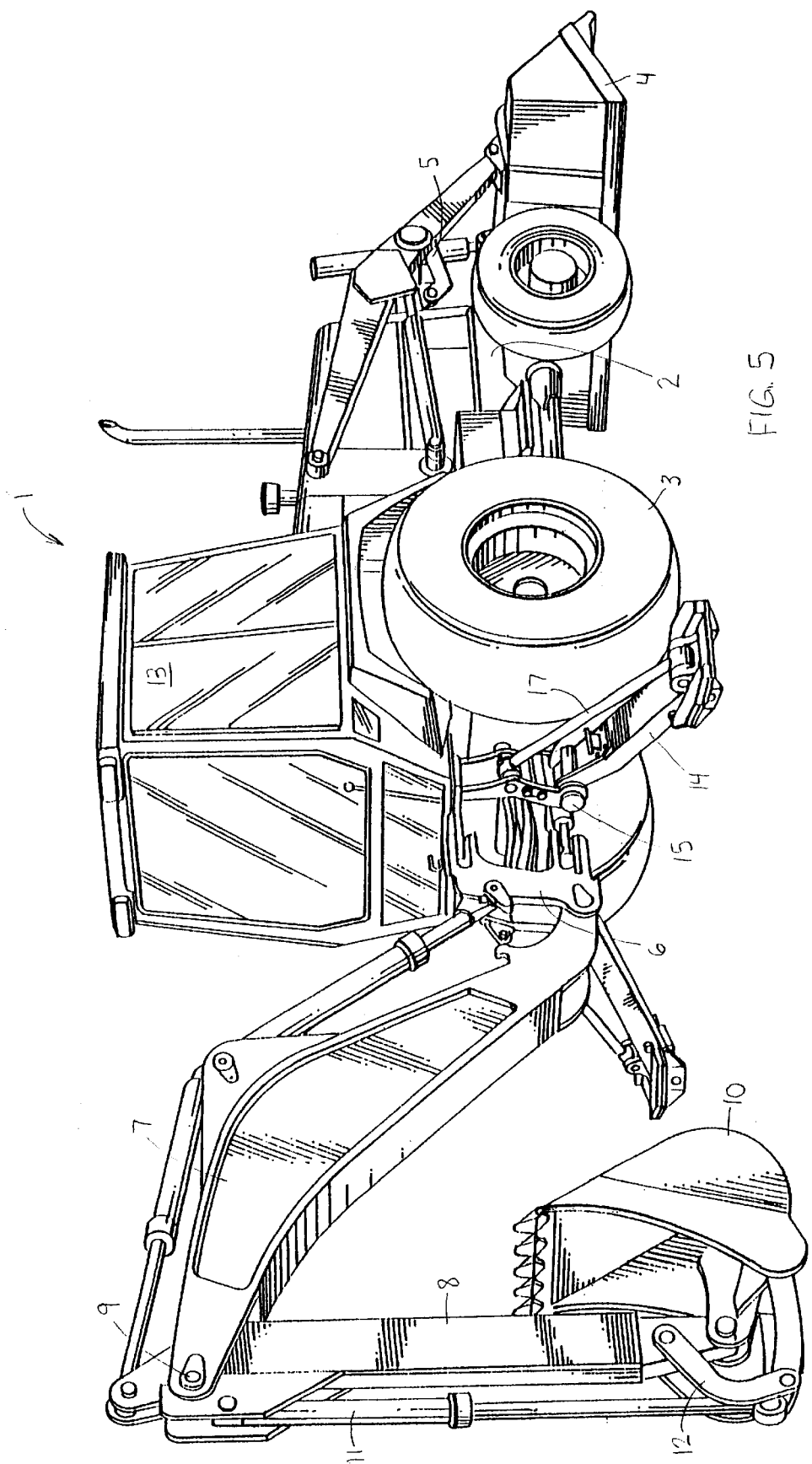
FIG. 5 is a rear perspective view of a backhoe loader showing rigid struts for bracing the stabilizer arms.

A backhoe loader 1 has two stabilizer arms 14 that engage the ground to support and stabilize the machine during backhoe operation. Each stabilizer arm 14 couples to the machine frame 2 by a horizontal pivot 15. Typically, a linear actuator 16 braces each stabilizer arm 14 in the working position and moves each arm 14 between working and stowage positions. The linear actuator 16 is usually a hydraulic cylinder, but could also be a jackscrew or other suitable device for linear motion. In an alternative design, a rigid strut 17 braces each stabilizer arm 14 in the working position in place of a linear actuator 16, and the arm 14 is moved between working and stowage positions by manual effort. FIG. 5 illustrates rigid struts bracing the stabilizer arms on a backhoe loader.

Figure 2:
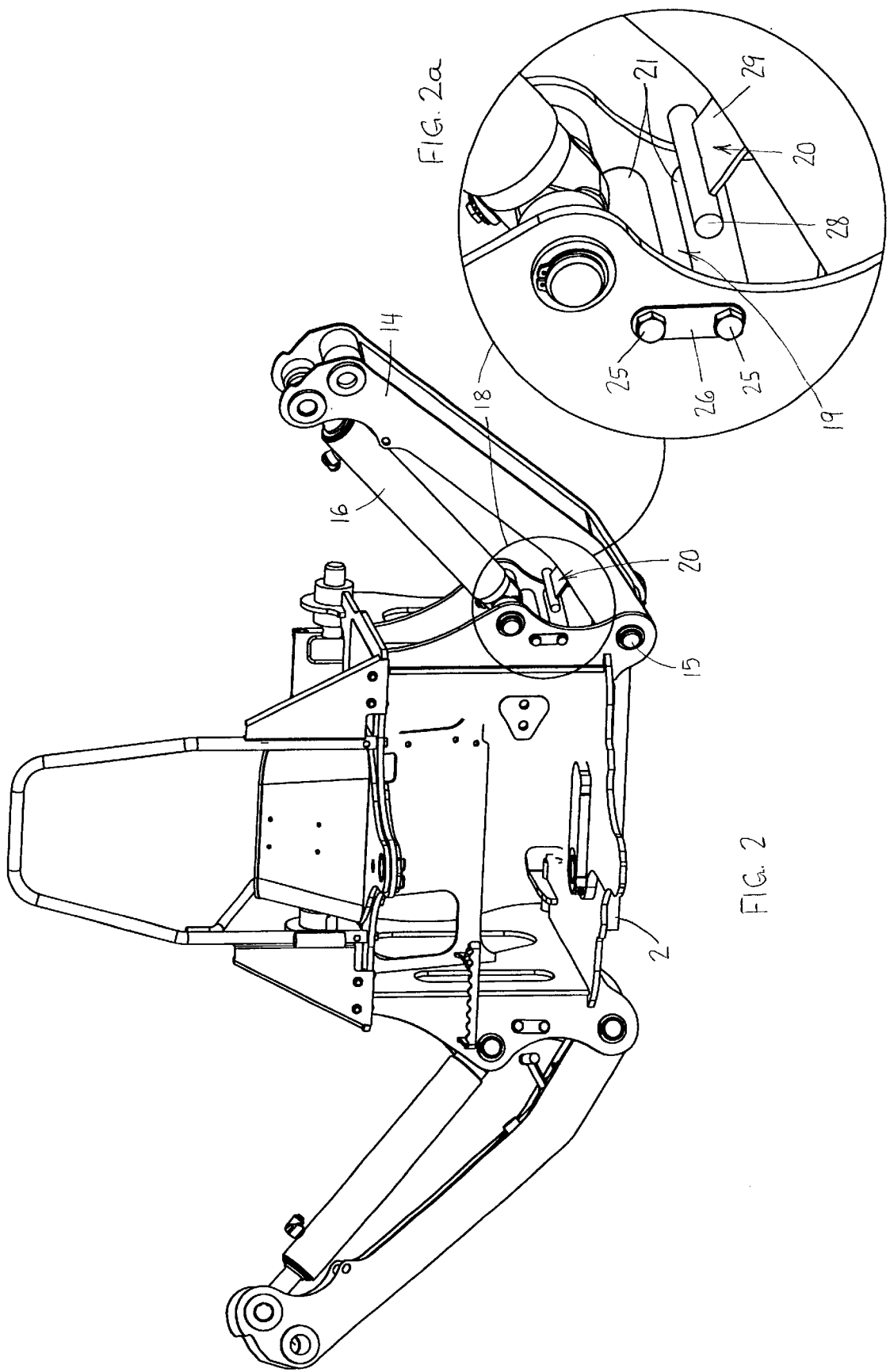
FIG. 2 is a perspective view of the frame, stabilizer arm, and latch mechanism shown disengaged.

Typically, the stabilizer arm 14 on a backhoe loader 1 is held in the stowage position solely by the linear actuator 16. However, as gravity acts against the linear actuator 16, the arm 14 may gradually lower. This lowering of the arm 14 while in the stowage position is undesirable. In applications where a strut 17 is used in place of a linear actuator 16, the stabilizer arm 14 must be held in the stowage position by another means, such as a manually engaged and disengaged latch. FIG. 2 illustrates the present invention, an improved, automatically engaging and disengaging latch mechanism 18 for retaining a stabilizer arm 14 in the stowage position.

The latch mechanism 18 has a first portion 19 and a second portion 20. The first portion 19 attaches to the machine frame 2, and the second portion 20 attaches to the stabilizer arm 14. The first portion 19 of the latch is a receptacle having two parallel rollers 21 of a resilient material. In the illustrated embodiment, each of the rollers has a core 22 of elastomeric material surrounded by an inner and an outer wear sleeve 23 24 of metallic material. Each roller 21 rotationally mounts about a roller axle 25 attached to the machine frame 2. An axle spacer 26 locates and constrains both of the two roller axles 25 relative to each other in order to control the separation distance between the roller surfaces and achieve a desired receptacle opening 27 width.

The second portion 20 of the latch is a probe having a head 28 and a shank 29. The head 28 is larger than the receptacle opening 27 width, and the shank 29 is smaller than the head 28. In the illustrated embodiment, the head 28 is a rigid rod oriented parallel to the receptacle rollers 21, and the shank 29 is a rigid plate having a first end 30 and a second end 31. The first end 30 of the plate attaches to one side of the rod 28, and the second end 31 of the plate attaches to a mounting plate 32 attached to the stabilizer arm 14. The plate 29 extends from the mounting plate 32 through the receptacle opening 27 when the arm 14 is in the stowage position.

Figure 3:
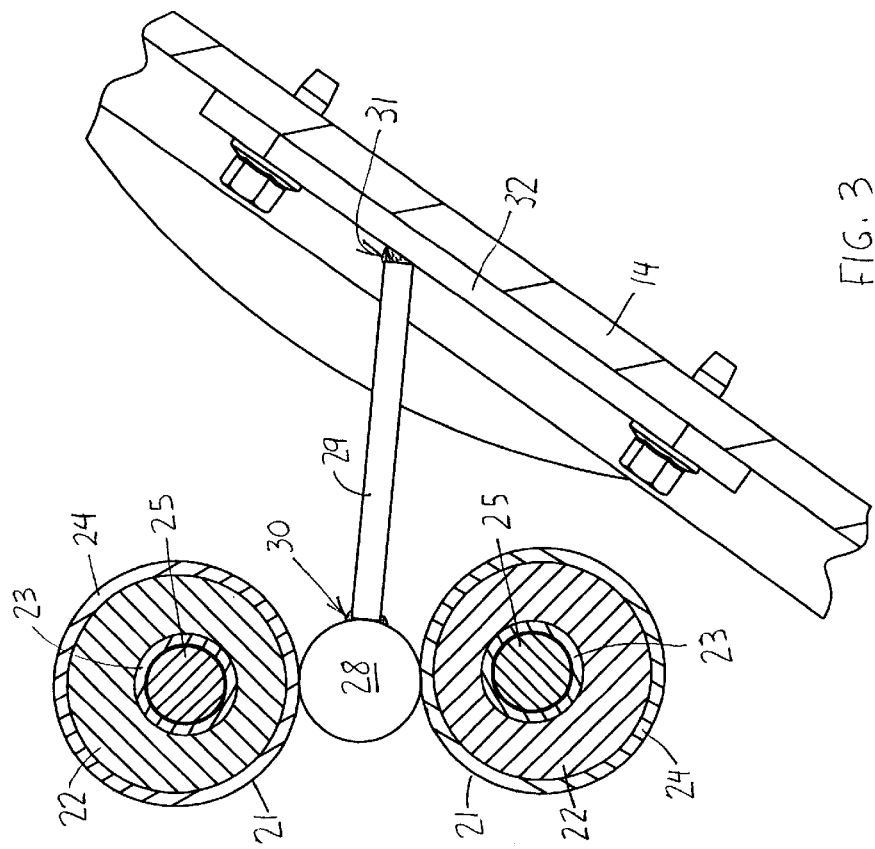
FIG. 3 is a cross-section view of the frame, stabilizer arm, and latch mechanism shown as the latch is engaging and disengaging.

In operation, the arm 14 moves to and from the stowage position, either by a linear actuator 16 or by manual effort. As the arm approaches or departs the stowage position, the latch probe 20 engages the latch receptacle 19. The movement force of the arm 14 is sufficient to cause the latch probe head 28, being larger than the receptacle opening 27 width, to deform the receptacle rollers 21 as it is forced through the receptacle opening 27. The deformation of the receptacle rollers 21 allows the probe head 28 to pass through the receptacle opening 27, thus providing for automatic engagement and disengagement of the latch 18. FIG. 3 illustrates the two parallel rollers 21 deforming as the probe 20 passes through the receptacle opening 27 when the arm 14 is moved to and from the stowage position by the force of a hydraulic cylinder 16.

Figure 4:
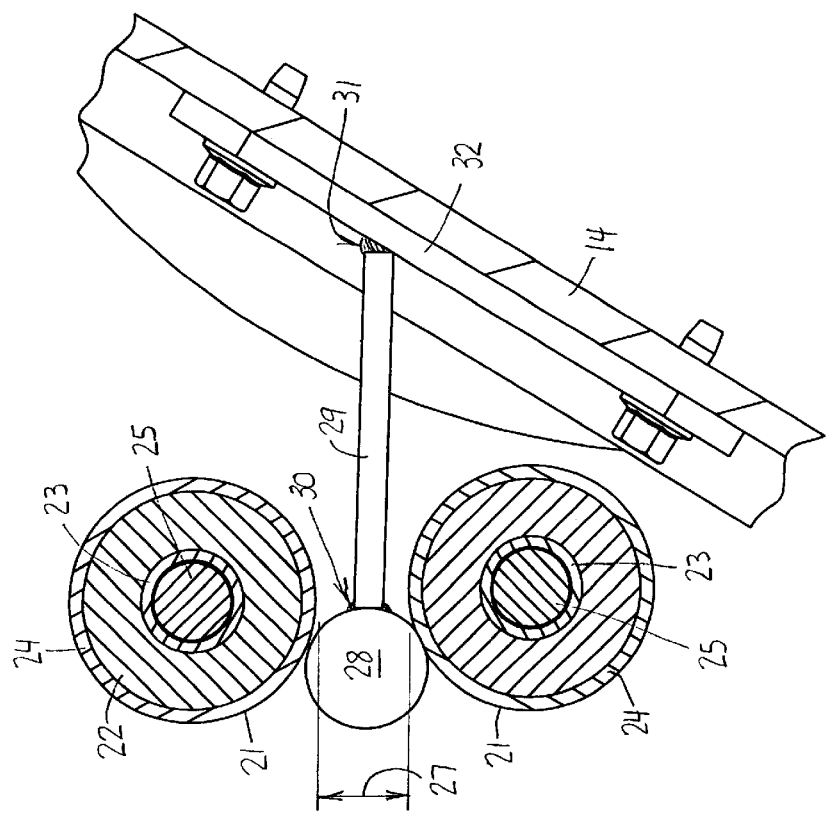
FIG. 4 is a cross-section view of the frame, stabilizer arm, and latch mechanism shown engaged.

After the probe head 28 has passed through the receptacle opening 27, the receptacle rollers 21 return to their original shape. When the stabilizer arm 14 is in the stowage position and the latch 18 is engaged, the force of gravity or inertia upon the stabilizer arm 14 is insufficient to cause the receptacle rollers 21 to be deformed by the latch probe 20. The probe head 28, being larger that the receptacle opening 27, is prevented from passing through the receptacle opening 27 and thus restrains the arm 14 in the stowage position. FIG. 4 illustrates the latch receptacle 19 and probe 20 cooperating with each other such that the two parallel rollers 21 of the receptacle restrain the probe 20 when the arm 14 is in the stowage position.

Having described the preferred embodiment, it will become apparent that various modifications can be made without departing from the scope of the invention as defined in the accompanying claims.

What is claimed is:

1. A work machine comprising:
    a frame;
    an arm for performing a work function, the arm having a first end and a second end, the first end being pivotally attached to the frame, the arm having a working position and a stowage position;
    a linear actuator for bracing the arm in the working position and for moving the arm between the working position and the stowage position, the linear actuator having a first end and a second end, the first end being pivotally attached to the arm, and the second end being pivotally attached to the frame;
    a latch mechanism for retaining the arm in the stowage position, the latch having a first portion and a second portion, one of the first and second portions attaching to the frame, and another of the first and second portions attaching to the arm, the first portion of the latch being a receptacle comprising two parallel members each having a core of elastomeric material surrounded by an outer wear sleeve of metallic material, both of the two members being separated from one another by a receptacle opening width, the second portion of the latch being a probe having a head and a shank, the head being larger than the receptacle opening width, the shank being smaller than the head, the two portions of the latch cooperating with each other such that the two parallel members restrain the probe when the arm is in the stowage position, and such that the two parallel members deform as the probe passes through the receptacle opening when the arm is moved to and from the stowage position by the force of the linear actuator, providing for automatic engagement and disengagement of the latch.

2. A work machine as defined by claim 1 wherein both of the two parallel members of the latch receptacle are rollers being rotationally mounted about a roller axle, each of the rollers having an inner wear sleeve of metallic material.

3. A work machine as defined by claim 2 wherein the arm is in a substantially vertical orientation when in the stowage position.

4. A work machine as defined by claim 3 wherein the arm is a stabilizer arm.

5. A work machine as defined by claim 4 wherein the first portion of the latch attaches to the frame and the second portion of the latch attaches to the arm.

6. A work machine as defined by claim 5 wherein the linear actuator is a hydraulic cylinder.

7. A work machine as defined by claim 6 wherein the work machine is a backhoe loader.

8. A work machine comprising:
    a frame;
    an arm for performing a work function, the arm having a first end and a second end, the first end being pivotally attached to the frame, the arm having a working position and a stowage position;
    a strut for bracing the arm in the working position, the strut having a first end and a second end, the first end being attached to the arm when in the working position, and the second end being attached to the frame when in the working position;
    a latch mechanism for retaining the arm in the stowage position, the latch having a first portion and a second portion, one of the first and second portions attaching to the frame, and another of the first and second portions attaching to the arm, the first portion of the latch being a receptacle comprising two parallel members each having a core of elastomeric material surrounded by an outer wear sleeve of metallic material, both of the two members being separated from one another by a receptacle opening width, the second portion of the latch being a probe having a head and a shank, the head being larger than the receptacle opening width, the shank being smaller than the head, the two portions of the latch cooperating with each other such that the two parallel members restrain the probe when the arm is in the stowage position, and such that the two parallel members deform as the probe passes through the receptacle opening when the arm is moved to and from the stowage position by a sufficient force, providing for automatic engagement and disengagement of the latch.

9. A work machine as defined by claim 8 wherein both of the two parallel members of the latch receptacle are rollers being rotationally mounted about a roller axle, each of the rollers having an inner outer wear sleeve of metallic material.

10. A work machine as defined by claim 9 wherein the arm is in a substantially vertical orientation when in the stowage position.

11. A work machine as defined by claim 10 wherein the arm is a stabilizer arm.

12. A work machine as defined by claim 11 wherein the first portion of the latch attaches to the frame and the second portion of the latch attaches to the arm.

13. A work machine as defined by claim 12 wherein the work machine is a backhoe loader.

14. A backhoe loader comprising:

a frame;

a stabilizer arm, the stabilizer arm having a first end and a second end, the first end being pivotally attached to the frame, the stabilizer arm having a working position and a substantially vertically oriented stowage position;

a hydraulic cylinder for bracing the arm in the working position and for moving the arm between the working position and the stowage position, the hydraulic cylinder having a first end and a second end, the first end being pivotally attached to the stabilizer arm, and the second end being pivotally attached to the frame;

a latch mechanism for retaining the stabilizer arm in the stowage position, the latch having a first portion and a second portion, the first portion attaching to the frame, and the second portion attaching to the arm, the first portion of the latch being a receptacle having two parallel rollers of a resilient material, each of the two rollers being rotationally mounted about a roller axle, both of the two rollers being separated from one another by a receptacle opening width, the second portion of the latch being a probe having a head and a shank, the head being larger than the receptacle opening width, the shank being smaller than the head, the two portions of the latch cooperating with each other such that the two parallel rollers restrain the probe when the arm is in the stowage position, and such that the two parallel rollers deform as the probe passes through the receptacle opening when the arm is moved to and from the stowage position by the force of the hydraulic cylinder, providing for automatic engagement and disengagement of the latch.

15. A work machine as defined by claim 14 wherein each of the rollers of the latch receptacle has a core of elastomeric material surrounded by an inner and an outer wear sleeve of metallic material.

16. A work machine as defined by claim 14 wherein an axle spacer locates and constrains both of the two roller axles of the latch receptacle relative to each other.

17. A work machine as defined by claim 14 wherein the head is a rigid rod oriented parallel to the receptacle rollers, the shank is a rigid plate having a first end and a second end, the first end of the plate attaching to one side of the rod, and the second end of the plate attaching to a mounting plate, the mounting plate attaching to the stabilizer arm, the plate extending from the mounting plate through the receptacle opening when the arm is in the stowage position.

* * * * *